United States Statutory Invention Registration [19]

[11] Reg. Number: H159

Kaszas et al. [43] Published: Nov. 4, 1986

[54] SHAPED TRAJECTORY CRUISE MISSILE LAUNCH MODE

[75] Inventors: Leo R. Kaszas, San Diego; Robert J. Kendrew, El Cajon; David K. Shutts, San Diego, all of Calif.

[73] Assignee: The United States of America as represented by the Secretary of the Navy, Washington, D.C.

[21] Appl. No.: 797,090

[22] Filed: Dec. 17, 1984

[51] Int. Cl.[4] ..... F41G 7/00; F42B 15/02

[52] U.S. Cl. ..... 244/3.21; 244/3.1

[58] Field of Search ..... 244/3.1, 3.15, 3.16, 244/3.21; 89/1.809, 1.810, 1.818

[56] References Cited

U.S. PATENT DOCUMENTS

| | | | |
|---|---|---|---|
| 3,094,072 | 6/1963 | Parilla | 102/50 |
| 3,272,124 | 9/1966 | Marsh et al. | 102/50 |
| 3,684,215 | 8/1972 | Jacobson et al. | 102/49 |
| 3,695,555 | 10/1972 | Chadwick | 244/3.16 |
| 3,759,466 | 9/1973 | Evers-Euterneck | 244/3 |
| 3,764,091 | 10/1973 | Crowhurst | 60/35 |
| 4,198,015 | 4/1980 | Yates et al. | 244/3.15 |
| 4,296,894 | 10/1981 | Schnabele et al. | 244/3.1 |
| 4,471,923 | 9/1984 | Hoppner et al. | 244/3.1 |

*Primary Examiner*—Charles T. Jordan

*Attorney, Agent, or Firm*—R. F. Beers; C. D. B. Curry; G. L. Craig

[57] ABSTRACT

The launch mode for a cruise missile utilizes a solid propellant booster rocket to propel the missile from the launch platform to a speed and altitude sufficient to enable the missile to transition to the cruise flight mode. Immediately following booster burnout the missile jettisons the booster and transitions to cruise flight by deploying aerodynamic lifting surfaces and starting its cruise engine. The shaped trajectory launch mode significantly reduces the required booster motor impulse by deploying the cruise missile wings during boost flight. The aerodynamic wing lift enables the missile to fly a flatter trajectory reducing performance lost in climb and results in higher booster burnout velocity and significant improvement in launch performance.

1 Claim, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHAPED TRAJECTORY CRUISE MISSILE LAUNCH MODE

BACKGROUND OF THE INVENTION

1. Field of Invention

The invention relates to shaping the launch mode trajectory of a cruise missile to more efficiently utilize the booster motor impulse and thereby improve missile launch capability and performance.

2. Description of the Prior Art

The launch mode of a cruise missile from a submerged submarine, surface ship or the ground utilizes a booster rocket motor to propel the missile to a burnout condition that enables the missile to transition to cruise flight. Following the jettison of the spent booster the wings are deployed and the cruise engine started. Stabilized cruise flight begins when the aerodynamic lift is sufficient to support the weight of the missile and reduce any vertical descent rate to zero. The altitude at which this occurs is called the pullout altitude. Aerodynamic lift, for a given missile configuration, is a function of the missile velocity relative to the ambient air. The missile velocity at which the aerodynamic lift is sufficient to support its weight is referred to as v for one "g" ($v_{1g}$). Typically, throughout the launch envelope, the booster does not provide the required velocity and missile altitude must be traded for increased velocity as the cruise engine begins to accelerate the missile to the speed necessary to enable pullout prior to crashing to the surface.

Launch performance margin is the excess capability to transition to cruise flight. The measure of performance is pullout altitude. An optimum boost phase trajectory is one that results in the highest pullout altitude. The higher the pullout altitude the greater the launch performance capability. Excess launch performance capability can be used to expand the launch envelope. In the submarine launch case the envelope is defined as a function of launch depth and surface winds. Excess pullout performance can be traded off for deeper launch depths. Surface headwinds increase launch performance capability because they increase the relative velocity. As the headwind increases, eventually a fly away condition exists where the burnout velcoity exceeds $v_{1g}$. Tailwinds penalize launch performance in that they reduce the relative velocity resulting in lower pullout altitude. To achieve the highest pullout altitude requires a burnout condition that maximizes the velocity at a positive flight path angle. The burnout altitude is designed to be consistent with maximizing the pullout altitude.

Thus the goal for optimum launch performance for a given booster rocket motor is to maximize the burnout velocity at a positive flight path angle. The trajectory design factors which result in loss of velocity are drag, alignment and gravity. In the submarine launch case, drag losses result from both hydrodynamic and aerodynamic drag. Aerodynamic drag increases with missile angle of attack. Alignment velocity losses occur when the booster thrust vector is not aligned parallel to the velocity vector. Alignment losses are caused by high missile angle of attack and thrust vector control deflections. Far and away the largest velocity losses are produced by gravity. This is the effect of gravity acting opposite to the velocity vector. This term is extremely large for lofted trajectories. The trajectory design problem, however, is that pullout altitude is a sensitive function of flight path angle at burnout as well as burnout velocity. If the flight path angle is too low, there is excessive altitude loss because of the build-up of descent velocity. This problem is further compounded if the burnout altitude is too low. Within the prior art, the design approach is to loft the missile, accepting the large velocity loss due to gravity, in order to achieve burnout at a positive flight path angle. Without lofting the trajectory, the missile flight path angle at burnout becomes too low or even negative which increases the descent rate resulting in lower pullout altitude even though the burnout velocity is higher because of reduced gravity losses.

Booster burnout velocity can only be increased by flying a flatter trajectory at a lower flight path angle. The only way to avoid the small or negative flight path angle at burnout is to provide an upward force on the missile normal to flight path by either inclining the missile thrust vector or by deploying the missile wings during boost to obtain aerodynamic lift. The former approach has the penalty of the large velocity loss due to misalignment of the thrust vector and the velocity vector. The latter approach increases velocity losses slightly due to increased drag caused by a large angle of attack but has significantly reduced velocity losses due to gravity. The net result is a significant improvement in launch performance.

The present invention provides a technique for shaping the launch trajectory by deploying the wings of the cruise missile during the boost phase of the launch enabling a flatter trajectory that significantly increases burnout velocity by reducing gravity losses while maintaining a positive flight path angle. This is accomplished by using wing lift in addition to that provided by the vertical component of the rocket motor. The blend of rocket motor and aerodynamic lift considerably increases the complexity of the missile autopilot. However, greatly increased utilization of the rocket motor impulse is achieved. This means that with the shaped trajectory design a smaller booster rocket motor can be used or, alternatively, the launch performance envelope is vastly improved for the same rocket motor. Although the principal embodiment to be described is for the most complex case, submarine launch mode, the shaped trajectory design is equally applicable to any surface launch mode. This means that with this design a smaller rocket motor can be used to achieve the same launch performance as that of a larger motor using the current design.

SUMMARY OF INVENTION

Briefly described is a technique for shaping the trajectory of a submarine or surface launched cruise missile to achieve higher booster burnout velocity and higher pullout altitude of the missile at the start of stabilized cruise flight. The missile wings are deployed during the boost phase and a blend of booster and aerodynamic lift is achieved permitting the missile to fly a flatter trajectory resulting in significantly increased launch performance.

The primary object of invention is to improve the launch performance of a cruise missile to more efficiently utilize the booster rocket impulse.

DESCRIPTION OF THE ORIGINAL DRAWINGS

FIG. 1 schematically illustrates the prior art launch trajectory and the shaped launch trajectory of the present invention.

FIG. 2 schematically illustrates launch performance capability of the prior art and the shaped launch trajectory as a function of launch depth and windspeed.

DESCRIPTION OF THE PREFERRED EMBODIMENT

Figure 1:
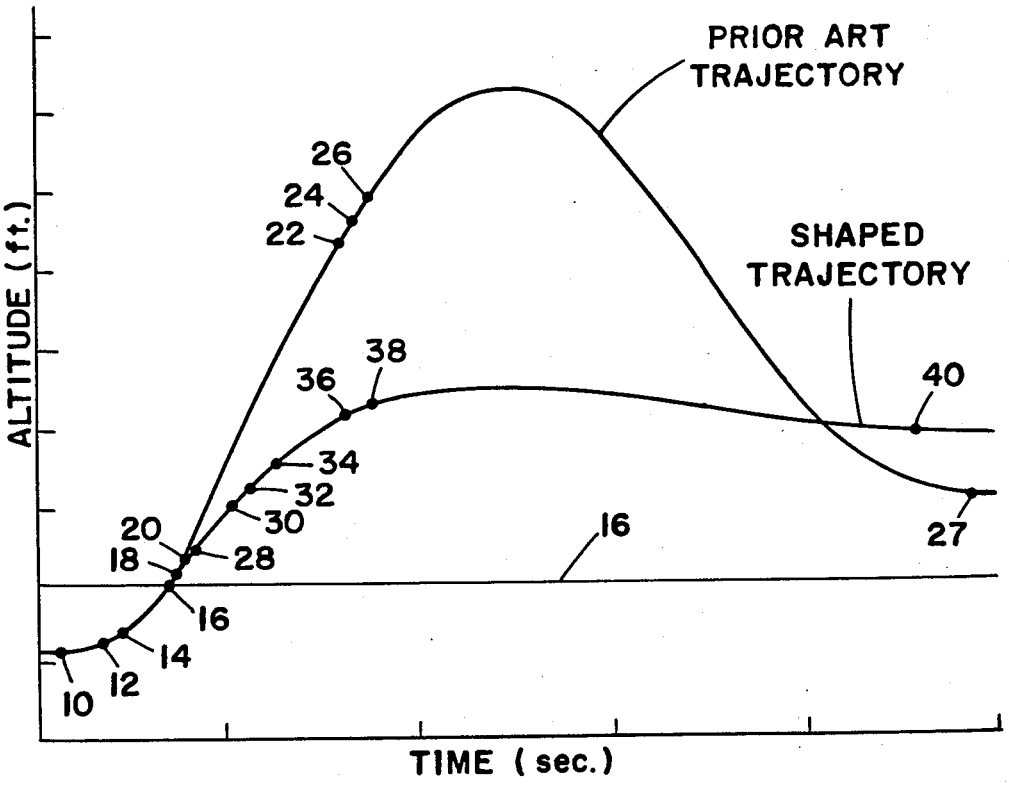

A comparision of event sequence and launch trajectory of prior art with the event sequence and shaped trajectory of the present invention may be seen by referring to FIG. 1. For the prior art submarine launch mode, the missile is launched 10, the booster ignited 12 and the TVC activated 14 to produce an initial high flight path angle and high angle-of-attack in the missile as it approaches the ocean surface 16. After the missile broaches the surface, a broach test is performed and the underwater protective covers are jettisoned 18. The aerodynamic control fins are then deployed 20 and for the remaining portion of boost flight they provide roll control and the TVC system provides pitch and yaw control. At booster burnout, the booster is jettisoned 22, then the wings of the missile are deployed 24 and the cruise engine is started 26. The missile continues to rise in a steep trajectory to its apogee and then pushes over descending and gaining speed, building up the aerodynamic lift of its wings. When sufficient speed is achieved, the missile pulls out of the dive and begins stabilized cruise flight 27. The shaped trajectory of the present invention initially follows the same sequence for an underwater launch as the normal prior art trajectory to performance of a broach test, jettisoning of the covers 18, and deployment of the control fins for roll control 20. After this event, the sequencing of the trajectories diverges. In the shaped trajectory, immediately following control fin deployment, the missile autopilot implements a pushover command 28. The missile cruise engine inlet is then deployed 30 and the missile wing doors are opened 32 to enable wing deployment. The missile is commanded using the TVC system to a small positive angle of attack and the trajectory is shaped to result in a flight path angle of about 10°. The missile wings are then deployed 34. From wing deployment 34 to jettison of the booster 36, the missile trajectory is controlled by commanding maximum aerodynamic lift. During this time, flight control of the missile is a blend of thrust vector control and aerodynamic control. The maximum aerodynamic lift command is maintained from booster jettison through cruise engine start 38 until pullout in stabilized cruise flight 40. Thus even though both the prior art and the shaped trajectory are optimized with respect to pullout altitude, the shaped trajectory, by deploying the wings early and blending booster lift and thrust vector control with aerodynamic lift and control, achieves a much more efficient use of booster impulse resulting in a higher velocity at booster burnout and a higher pullout altitude.

Figure 2:
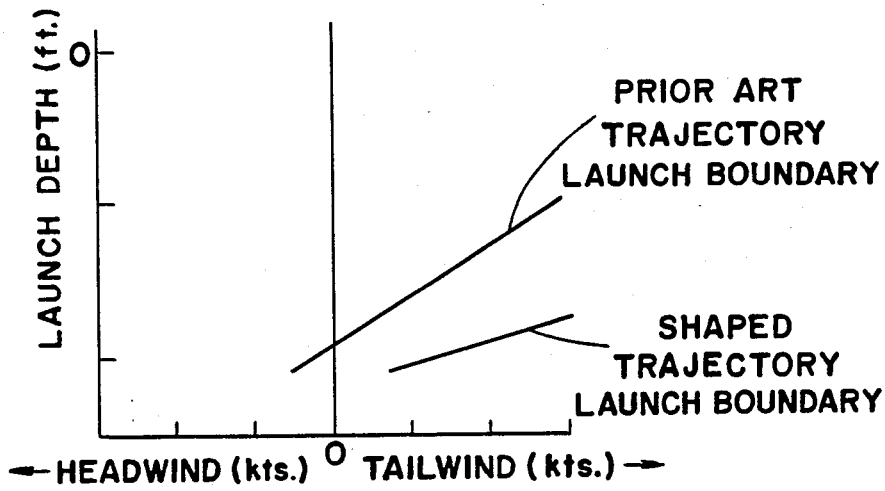

Referring to FIG. 2, the improved launch performance capability of the launch envelope of the shaped trajectory launch mode is compared with that of the prior art. For the same booster rocket motor, the shaped trajectory launch mode more efficiently utilizes the booster motor impulse permitting a significant increase in the launch envelope. FIG. 2 is a plot of empirical data demonstrating that the shaped trajectory launch mode permits launches with greater tailwinds or at greater depths than the normal trajectory of prior art. This again is a more efficient launch mode as well as one making the launch platform less vulnerable.

While the present invention has been described for a submarine launched cruise missile, it is by way of example and not limitation. The early pushover to a flatter trajectory and the early wing deployment work equally well for any surface launched cruise missile.

What is claimed is:

1. A method of optimizing the launch mode of a cruise missile having an autopilot to achieve higher missile velocity at booster burnout and higher altitude at the beginning of stabilized cruise flight, the improvement comprising the steps of:

(a) launching said cruise missile from a launch platform, said cruise missile having a booster motor, a deployable inlet and deployable wings;

(b) activating a thrust vector control system of said booster motor to impart a relatively high flight path angle to said missile;

(c) jettisoning protective covers about said missile at a predetermined height above said launch platform;

(d) deploying aerodynamic control fins carried by said missile such that said fins control roll motion and said thrust vector control system controls pitch and yaw motion of said missile;

(e) commanding an immediate pushover of said missile to a much smaller predetermined flight path angle by said autopilot;

(f) deploying the inlet of said missile;

(g) deploying the wings of said missile during the burning of said booster motor to achieve a blend of aerodynamic lift and control of said missile with booster lift and thrust vector control of said missile;

(h) commanding said missile by said autopilot to achieve the maximum allowable lift coefficient of said missile with said blend of said booster motor and said aerodynamic lift while continuing to decrease said flight path angle of said missile to a small positive, predetermined value;

(i) jettisoning said booster motor upon booster burnout;

(j) starting a cruise engine carried aboard said missile; and (k) commanding said missile by said autopilot to pull out in stabilized cruise flight at an altitude calculated for an optimum missile velocity and flight path angle.

* * * * *